United States Patent
Ketola et al.

(10) Patent No.: US 7,197,551 B2
(45) Date of Patent: Mar. 27, 2007

(54) METHOD AND SYSTEM FOR IMPLEMENTING SUPERVISION IN A TELECOMMUNICATION SYSTEM

(75) Inventors: Antti Ketola, Helsinki (FI); Anssi Liuhto, Espoo (FI)

(73) Assignee: Nokia Telecommunications Oy, Helsinki (FI)

(*) Notice: Subject to any disclaimer, the term of this patent is extended or adjusted under 35 U.S.C. 154(b) by 649 days.

(21) Appl. No.: 09/998,324

(22) Filed: Nov. 29, 2001

(65) Prior Publication Data
US 2002/0038361 A1    Mar. 28, 2002

Related U.S. Application Data

(63) Continuation of application No. PCT/FI00/00511, filed on Jun. 7, 2000.

(30) Foreign Application Priority Data
Jun. 9, 1999    (FI)    ..................... 991323

(51) Int. Cl.
G06F 15/16    (2006.01)
H04M 3/22    (2006.01)

(52) U.S. Cl. .................. 709/223; 379/34; 379/85; 379/88; 379/112; 379/133; 379/265; 709/224; 709/225; 709/226; 709/245; 709/250; 701/35; 455/2

(58) Field of Classification Search ........ 709/220–226; 370/278, 396; 379/265.03, 26, 34, 85, 133, 379/88, 112; 705/7; 701/35; 455/2
See application file for complete search history.

(56) References Cited

U.S. PATENT DOCUMENTS

| | | | |
|---|---|---|---|
| 4,615,028 A | 9/1986 | Lewis et al. | |
| 5,678,006 A | 10/1997 | Valizadeh et al. | |
| 5,818,907 A * | 10/1998 | Maloney et al. | 379/32.01 |
| 5,848,053 A * | 12/1998 | Ardon | 370/218 |
| 5,862,331 A * | 1/1999 | Herriot | 709/219 |
| 5,946,375 A * | 8/1999 | Pattison et al. | 379/112.01 |
| 6,026,147 A | 2/2000 | Yeo | |

(Continued)

FOREIGN PATENT DOCUMENTS

EP    0 736 993    10/1996

(Continued)

OTHER PUBLICATIONS

Savor, et al., "Toward Automatic Detection of Software Failures", *Computer*, vol. 31, pp. 68-74 (Aug. 1998).
International Search Report for PCT/FI00/00511.

*Primary Examiner*—David Wiley
*Assistant Examiner*—Jude J. Jean-Gilles
(74) *Attorney, Agent, or Firm*—Squire, Sanders & Dempsey, LLP.

(57) ABSTRACT

Method and system for automatically configuring supervision and performing supervision in a supervision system comprising a supervision center; and a supervision block which contains processes performing supervision tasks. The supervision system is preferably a telephone switching system. In the method, the supervision block performing supervision functions is monitored and/or controlled via the supervision center. Furthermore, the objects monitored by a supervision block process performing supervision tasks are automatically registered in the supervision center as the supervision block processes become ready for operation, and information about the supervision block processes and/or about the services produced by them and/or about the objects being monitored is stored in the supervision center.

29 Claims, 2 Drawing Sheets

U.S. PATENT DOCUMENTS

Figure 1:
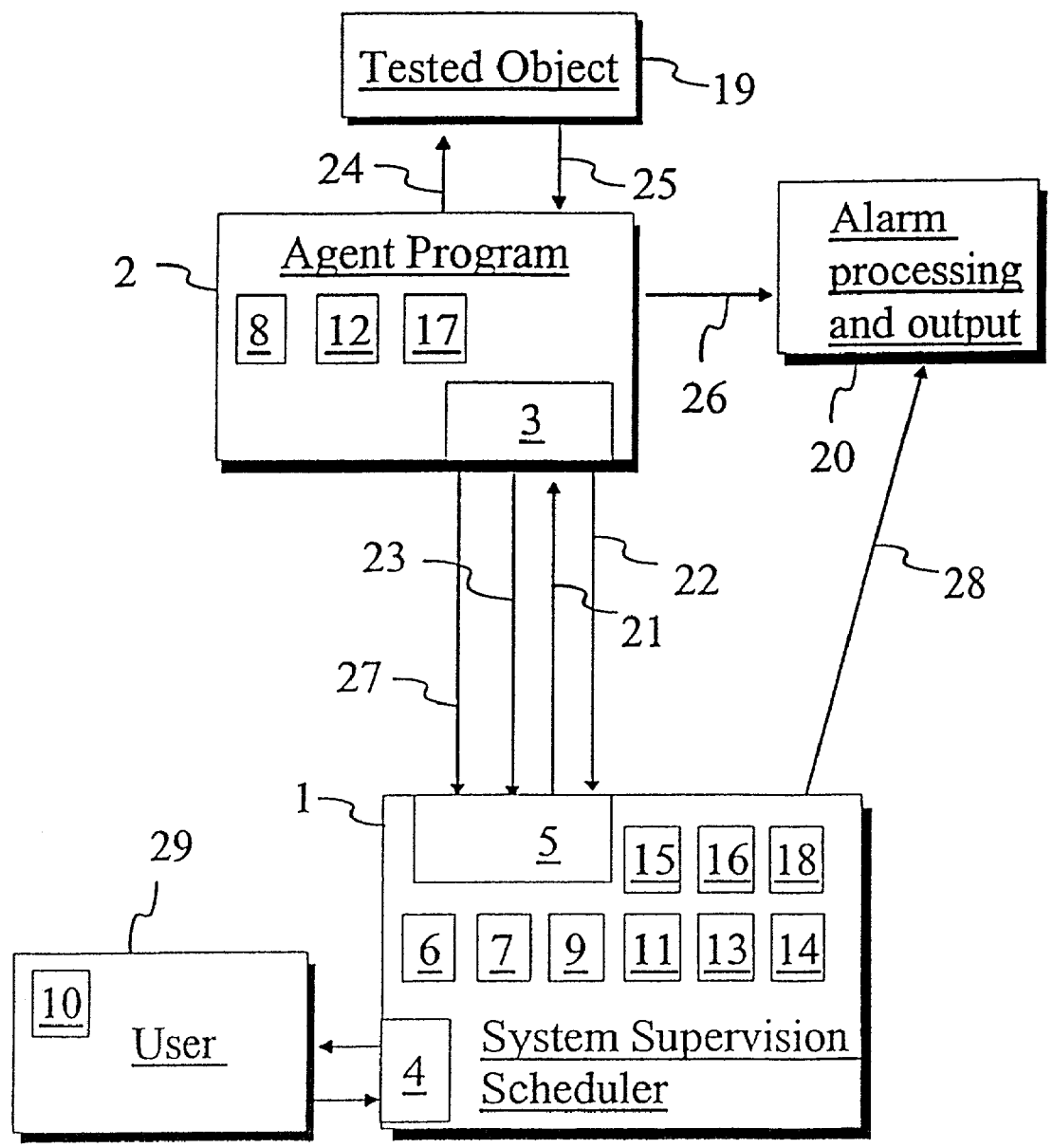

| | | | | |
|---|---|---|---|---|
| 6,058,163 A | * | 5/2000 | Pattison et al. | 379/265.06 |
| 6,058,412 A | | 5/2000 | Kojima et al. | |
| 6,073,162 A | | 6/2000 | Johannsen et al. | |
| 6,629,149 B1 | * | 9/2003 | Fraser et al. | 709/245 |
| 6,757,357 B1 | * | 6/2004 | Horton et al. | 379/9.03 |

FOREIGN PATENT DOCUMENTS

| | | |
|---|---|---|
| EP | 0 737 922 | 10/1996 |
| JP | 11-55402 | 2/1999 |
| JP | 11-127124 | 5/1999 |
| JP | 2000-132775 | 12/2000 |

* cited by examiner

METHOD AND SYSTEM FOR IMPLEMENTING SUPERVISION IN A TELECOMMUNICATION SYSTEM

This application is a continuation of international application Ser. No. PCT/FI00/00511, filed Jun. 7, 2000.

FIELD OF THE INVENTION

The present invention relates to telecommunication technology. In particular, the invention concerns a new type of method and system for automatic configuration of a supervision system, preferably a telephone switching system, and for implementing supervision.

BACKGROUND OF THE INVENTION

The operation of a telecommunication network (e.g. PSTN, Public Switched Telephone Network; PLMN Public Land Mobile Network; ISDN, Integrated Services Digital Network) is based on telephone switching centers transmitting calls. Therefore, it is of primary importance that the telephone switching centers should work without problems. Telephone switching centers are intricate systems, which is why maintaining their performance is a challenging task. However, it is to be noted that the various supervision activities and systems must not be allowed to hamper the normal operation of the telephone switching system. Let it be stated as an example that supervision must not produce any disturbance in the transmission of calls.

The operation of the tests designed for supervision tasks is based on a test structure that allows the detection of different error situations. Supervision aims at discovering all abnormal situations and at the same time at preventing the occurrence of troublesome events due to error situations.

At present, the telephone switching system is supervised in a rather confused manner. The processes performing different functions carry out supervision tasks along with their normal functions. A specific problem relating to the tests is that the parameter data for the tests has been defined within the program code. As a result of this, real-time management of the tests is difficult, if not impossible.

The object of the present invention is to eliminate the drawbacks referred to above or at least to significantly alleviate them.

A specific object of the invention is to disclose a new type of method and system for automatic activation of supervision of the operation of a system, preferably a telephone switching system. After the processes responsible for supervision have been activated, they report to a supervision center and give the supervision center a chance to control the execution of the processes via various parameters. Supervision processes may report to the supervision center at any time.

As for the features characteristic of the invention, reference is made to the claims.

SUBJECT OF THE INVENTION

The method of the invention concerns automatic configuration and control of the supervision of a telecommunication system in a supervision system. The supervision system is preferably a telephone switching system. The central supervision system comprises a supervision center and a supervision block which contains processes performing supervision functions.

According to the invention, the processes in the supervision block of the supervision system and/or the objects monitored by them are automatically registered in the supervision center. The supervising process is registered when it becomes ready for operation. In conjunction with the registration, information about the processes in the supervision block and/or about the objects supervised and the supervision tasks performed by the processes is stored in the supervision center. It is important to note that the supervision center does not know the supervising processes beforehand but is only acquainted with them at run time.

The processes in the supervision block have a communication interface through which they communicate with the supervision center. The most important function of the supervision center is to see to it that the processes execute the supervision tasks at certain time intervals. In this way, the system can be easily controlled. As the supervision center manages the parameters of the supervising processes, the supervision tasks and their parameters can be controlled correspondingly by controlling the supervision center. This can be accomplished via the user interface of the supervision center. Furthermore, the supervision center comprises an interface through which the supervision block processes performing supervision tasks are registered.

The supervision center in itself does not perform any supervision tasks but only controls and supervises their execution. The supervision center stores process registration information in a specific supervision file as separate object data items. Object data refers to information relating to a given process performing a supervision task and to the test produced by the process.

In the supervision file, the various tests produced by the same process are stored as separate object data items. The object data comprises e.g. parameter data associated with the processes performing supervision. The information stored may additionally include e.g. the address of the process carrying out the supervision task and the default values of the parameters. The parameter data include e.g. the frequency of performance of the test and the number of times the test is executed each time when testing is performed. Via the user interface, by using the object data in the supervision file, it is possible to influence the tests performed by the processes.

For the supervision block processes performing supervision tasks to be able to register in the supervision center, they have to know the address data of the supervision center. The processes learn this address data e.g. via a special name service. Upon completion of execution of the processes performing supervision tasks, the result produced by them is sent to the supervision center.

The supervision block processes performing supervision tasks register in the supervision center by sending a registration message. A precondition for the registration of the process is that the process have a communication interface. A further requirement is that the process be able to carry out one or more tests and that the test should produce a result. If the test result produced by the process justifies an alarm, then the alarm data produced by the test is sent to the supervision center and/or to an actual alarm system.

The supervision center, too, may generate an alarm to an actual alarm system. An alarm may be triggered by various factors. Based on the alarm, it is possible to determine the location of the fault and perhaps also the original cause of the alarm. The list below presents a few examples of circumstances causing alarms:

when the supervision center gives a command to a supervision block process performing supervision tasks, no acknowledgement of receipt of the command is returned, the process performing a supervision task fails to return a response even though it has received the command for execution of the test, the response produced by the process performing the supervision task is inaccurate, no process performing a supervision task has been registered in the supervision center, or the number of processes performing supervision tasks is smaller after a restart of the supervision center.

Before sending a test command to a supervision block process performing a supervision task, the supervision center checks the state of the process. For the processes in the supervision block, it is possible to define states in which the processes are able to receive commands from the supervision center. Corresponding data is stored in the supervision file in conjunction with registration. The supervision block processes have e.g. three different states:

operative disabled, or discontinued.

When the state is "operative", the supervision block process receives and acknowledges the test command, performs the operations required by the test command and, upon completion of execution, sends the result to the supervision center. When the state is "disabled", the supervision file in the supervision center contains an entry about the supervision block process, but no test command can be sent to the process. When the state is "discontinued", the supervision file in the supervision center contains no entry about the process and no test commands can be sent to it. For the supervision block process to be re-entered into the supervision file, the process has to be reactivated.

The activity of the processes performing supervision tasks must not interfere with the normal operation of the supervision system, preferably a telephone switching system. This can be taken into account e.g. by not allowing tests that would impair the normal operation of the supervision system to be registered in the supervision center at all. The supervision system comprises one or more supervision centers in operation. In an active supervision situation, the supervision center may be informed by one of the object systems being supervised that the object system has been restarted. As a result of this, the supervision center deletes the entries relating to the restarted object system from the supervision file. Similarly, the state of the object system being supervised may change during supervision. In this case, it is possible to change the object entries in the supervision file so as to make them consistent with the changed new state.

The processes performing supervision tasks may cancel their registration at any time. In the following, a method for deleting object data from the supervision file in the supervision center will be described. In the supervision file in the supervision center, the item in question is marked with a label indicating that it is to be deleted. Deletion of the object data takes place the next time when execution of a test operation corresponding to the object data in question is attempted. The deletion of object data from the supervision file is implemented in the above-described delayed manner because, if the object data were deleted immediately, a test operation corresponding to the object data might be going on at the moment.

Via the user interface, it is possible to influence the execution of supervision tasks. It is to be noted that only the execution of registered processes and the tests performed by them can be influenced via the user interface. Via the user interface, a list of the tests in use can be obtained. Via the user interface, it is possible to disable a given test and, correspondingly, a disabled test can be restored to an operative state again. A disabled test is still visible in the supervision file, but no new commands concerning this test can be sent to the process. Further, the operation of a given test can be stopped altogether via the user interface. This means that the execution of the process performing a supervision task will go on, but it is no more requested to execute a given test that used to be comprised in it. In addition, via the user interface it is possible to influence a limited number of the parameters associated with the tests. It is possible to influence e.g. the frequency of execution of the tests and the number of times a given test is executed during a supervision cycle. The user interface can be utilized e.g. by an operator who wants to control the supervision system.

The system of the present invention comprises means for automatic registration in the supervision center of the objects to be monitored by the supervision block processes performing tasks of supervision of the operation of the supervision system. Moreover, the system comprises means for saving information relating to the processes performing supervision tasks and/or to the services provided by them in the supervision center in conjunction with registration.

In a preferred embodiment of the present invention, the system comprises means for receiving operational commands via the communication interface of the processes performing supervision tasks. Moreover, the system comprises means for checking the state of the supervision block process performing a supervision task before sending an action request to it, means for controlling the processes performing supervision tasks of the supervision center and/ or supervision block via the user interface and means for receiving the registrations of the supervision block processes performing supervision tasks via the interface.

In a preferred embodiment of the present invention, the system comprises means for sending the result produced by a supervision block process performing a supervision task to the supervision center and means for storing the registrations of the supervision block processes in a supervision file in the supervision center. In addition, the system comprises means for verifying the operation of a supervision block process performing a supervision task, means for issuing an alarm, means for analyzing the results associated with the processes performing supervision tasks and means for determining the address of the supervision center via a name service.

In a preferred embodiment of the present invention, the system comprises one or more operative supervision centers. In addition, the system comprises means for discontinuing a supervision block process performing a supervision task and/or for discontinuing the maintenance of an object monitored by a process and deleting the respective entry from the supervision file.

The present invention clarifies and facilitates the supervision of a supervision system, preferably a telephone switching system. According to the invention, the parameters pertaining to supervision can be controlled from outside the tests.

LIST OF ILLUSTRATIONS

Figure 2:
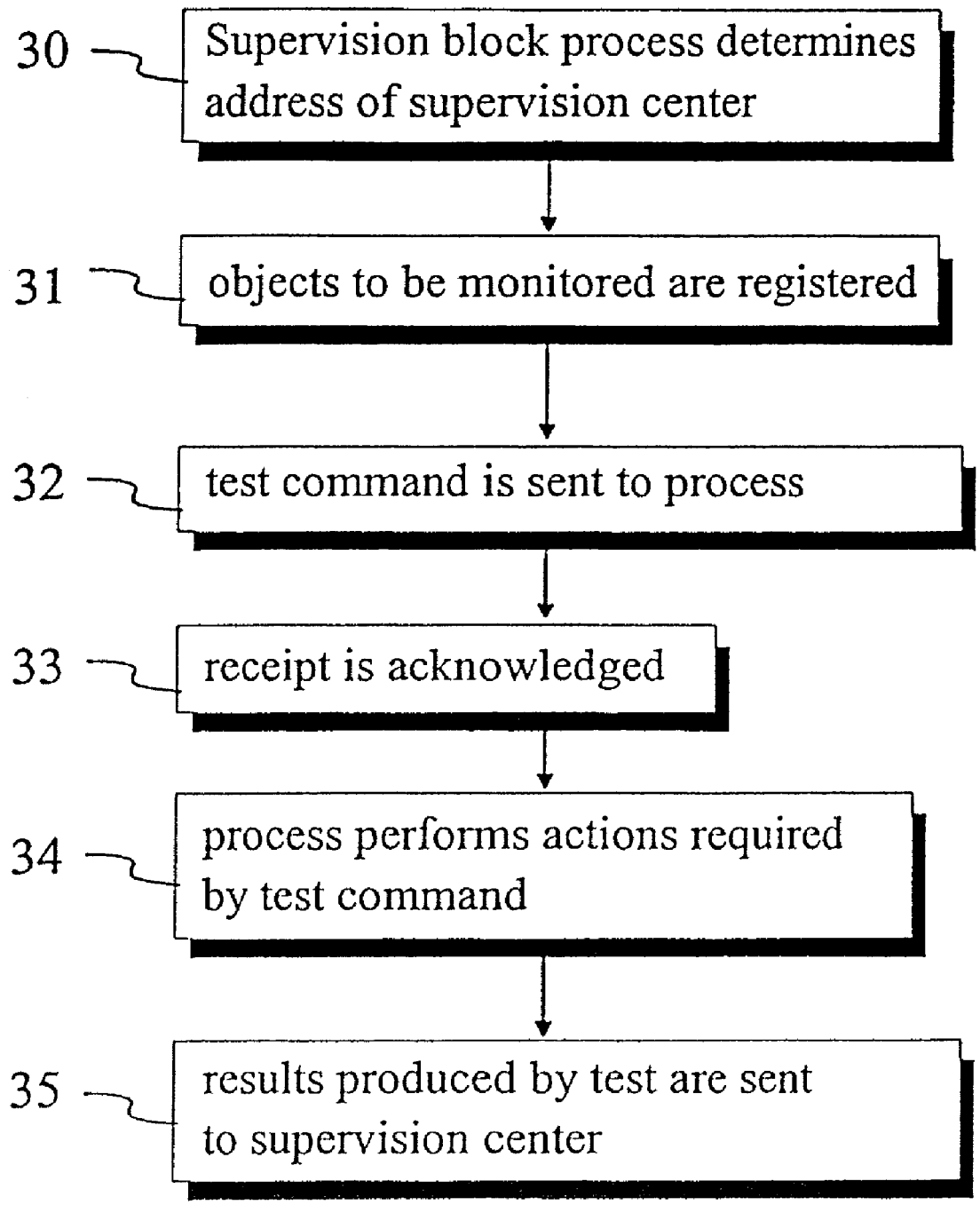

In the following, the invention will be described in detail by the aid of a few examples of its embodiments, wherein FIG. 1 represents an embodiment of a system according to the invention, and FIG. 2 presents a block diagram representing the operation of a process performing a supervision task according to the invention.

DETAILED DESCRIPTION OF THE INVENTION

A system as illustrated in FIG. 1 comprises a supervision center 1 and a supervision block 2, which contains processes performing supervision tasks. The supervision center 1 comprises a user interface 4, through which the supervision center 1 and/or the supervision block 2 processes performing supervision tasks are controlled. In addition, the supervision center 1 comprises an interface 5 for receiving the registrations of the supervision block 2 processes performing supervision tasks as they are registered in the supervision center 1. A supervision block 2 process performing a supervision task comprises a communication interface 3 used to receive operational commands from the supervision center 1. Further, the system illustrated in FIG. 1 comprises a user 29, an object 19 to be tested and a service block 20 dealing with alarms.

According to the invention, the processes performing supervision tasks automatically report to the supervision center 1 when they get ready for operation. The supervision center does not know the processes performing supervision tasks beforehand; instead, the supervision center 1 is acquainted with them via the registration procedure, arrow 23. When registering, the processes performing supervision tasks give information about themselves and/or the services they provide. The supervision center 1 accomplishes continuous supervision by repeatedly requesting testing services from the processes performing supervision tasks, in accordance with parameters defined by the supervision center 1. The processes registered may at any time request deletion of their registration from the supervision center 1, arrow 27. Via the user interface 4 of the supervision center 1, it is further possible to control the supervision center 1 and/or the supervision block 2 processes performing supervision tasks.

According to the invention, the supervision center 1 requests the supervision block 2 to carry out the tests it prescribes, arrow 21. Complying with the request, the processes performing supervision tasks in the supervision block 2 execute the selected tests, arrows 24 and 25. The response of the tests on the tested objects 19 is sent to the supervision center 1, arrow 22. The response is sent via the communication interface 3 of the supervision block 2 and received via interface 5 of the supervision center 1. In general, interface 5 receives what the communication interface 3 sends, and vice versa.

The result produced by a test may in some cases necessitate the activation of an alarm. An alarm is issued e.g. to the service block 20, arrow 26 or arrow 28. The service block 20 is e.g. the AMSSEB block of the DX200 telephone switching system manufactured by the applicant.

The supervision center 1 may also produce an alarm to the actual alarm system, the service block 20. An alarm is issued e.g. in a case where a supervision block 2 process performing a supervision task does not respond to an action request sent by the supervision center 1. Arrow 28 represents a situation where the supervision center 1 sets an alarm to the service block 20.

In this example, the system additionally comprises a user 29, which means e.g. the operator. The user 29 may e.g. ask the supervision system to provide a list of supervision processes registered. Via the supervision center 1, the user can influence the operation of the processes performing supervision tasks via the associated parameters.

The supervision center 1 comprises means 6 for automatic registration in the supervision center 1 of the objects monitored by the supervision block 2 processes performing supervision tasks, and means 7 for storing in the supervision center 1 information relating to the processes performing supervision tasks and/or to the services provided by them in conjunction with registration. Further, the supervision center 1 comprises means 9 for checking the state of the supervision block 2 process performing a supervision task before an action request is sent to it, and means 11 for receiving via interface 5 the registrations of the supervision block 2 processes performing supervision tasks.

In addition, the supervision center 1 comprises means 13 for storing the registrations of the processes of the supervision block 2 in the supervision file in the supervision center 1, means 14 for verifying the operation of a supervision block 2 process performing a supervision task and means 15 for issuing an alarm. The supervision center 1 comprises means 16 for analyzing the results associated with the processes performing supervision tasks. The supervision center 1 further comprises means 18 for discontinuing a supervision block 2 process performing a supervision task and/or for discontinuing the maintenance of the object monitored by the process and deleting the respective entry from the supervision file.

The user 29 is equipped with means 10 for controlling the supervision center 1 via the user interface 4.

The supervision block 2 comprises means 8 for receiving operational commands via the communication interface 3 of a supervision block 2 process performing supervision tasks, means 12 for sending the result produced by the supervision block 2 process performing a supervision task to the supervision center 1 and means 17 for determining the address of the supervision center 1 via a name service.

Means 3–18 are implemented e.g. as software blocks using a computer.

FIG. 2 presents a flow diagram representing a preferred example the operation of the supervision principle of the invention. A supervision block process means e.g. a software block implemented using a computer. As stated in block 30, the supervision block process determines the address of the supervision center. The address is determined e.g. by using a special name service. The process is a program which registers in the supervision center and which is able to execute one or more test cases. According to block 31, certain objects to be monitored are registered in the supervision center. For each test to be executed, the process is registered once in the supervision center. After registration, the process is in a state in which it is expecting a test command from the supervision center. The supervision center has to make sure of the operation of each registered test separately. For this purpose, the supervision center sends to the processes performing tests a command whereby the operation of the tests if verified, block 32. When the process receives a test command, it checks whether it is possible to execute the test purported by the command. The process sends an acknowledgement of receipt to the supervision center, at the same time informing the center as to whether the test can be executed or not, block 33.

Many events concerning the supervision center and the supervision block process are of a symmetrical nature. This means that for a given event there is an event of a reverse nature. Below are a few examples of this type of events:

the process responds/does not respond, the process receives the test command/does not receive the test command, or the test produces an error message/does not produce an error message.

The test command received from the supervision center comprises data indicating which test the command applies to. Based on this, the process is able to execute the right test, block 34. If the test detects faults during its execution, an alarm corresponding to the situation is sent e.g. to a separate alarm system if necessary. Once the functions comprised in the test have been carried out, the process sends the results produced by the test to the supervision center, block 35.

The invention is not restricted to the examples of its embodiments described above, but many variations are possible within the scope of the inventive idea defined in the claims.

The invention claimed is:

1. Method for automatically configuring supervision and performing supervision in a supervision system comprising
   a supervision center;
   a supervision block which contains processes performing supervision tasks,
   said method comprising the steps of:
   monitoring and/or controlling via the supervision center the supervision block processes performing supervision tasks,
   wherein the method comprises the following steps:
   the processes performing supervision tasks in the supervision block of the supervision system and/or the objects monitored by them are registered in the supervision center automatically as the processes in the supervision block become ready for operation; and
   information about the processes in the supervision block and/or about the services produced by them and/or about the objects monitored is saved in the supervision center in conjunction with the registration, and
   wherein the supervision block process performing a supervision task determines the address of the supervision center via a name service.

2. Method as defined in claim 1, wherein the supervision system is a telephone switching system.

3. Method as defined in claim 1, wherein a supervision block process performing supervision tasks comprises a communication interface through which operational commands are received from the supervision center.

4. Method as defined in claim 1, wherein the state of a registered supervision block process performing a supervision task is checked before an action request is sent to it.

5. Method as defined in claim 1, wherein the supervision center comprises a user interface via which the supervision center and/or the supervision block processes performing supervision tasks are controlled.

6. Method as defined in claim 1, wherein the supervision center comprises an interface for receiving the registration data when supervision block processes performing supervision tasks are registered in the supervision center.

7. Method as defined in claim 1, wherein the result of the supervision block process performing a supervision task is sent to the supervision center.

8. Method as defined in claim 1, wherein the registrations of the supervision block processes are stored in a supervision file in the supervision center.

9. Method as defined in claim 1, wherein the operation of the supervision block process performing a supervision task is verified in conjunction with the registration and an alarm is issued if the supervision block process performing a supervision task does not produce a response to a test command.

10. Method as defined in claim 1, wherein an alarm is issued if
    the response produced by the supervision block process performing a supervision task is inaccurate; and/or
    no supervision block processes performing supervision tasks are registered at all; and/or
    the number of test cases in the supervision file is lower after a restart of the system.

11. Method as defined claim 1, wherein the supervision file contains the address and/or identifier and/or test parameters and/or initial values of test parameters of the supervision block process performing a supervision task and/or other information.

12. Method as defined claim 1, wherein a registering supervision block process performing a supervision task contains one or more objects of monitoring.

13. Method as defined in claim 1, wherein a supervision block process performing a supervision task that impairs the normal operation of the telephone switching center shall not register in the supervision center.

14. Method as defined in claim 1, wherein the supervision system comprises one or more supervision centers in operation.

15. Method as defined in claim 1, wherein the supervision block process performing a supervision task and/or the maintenance of the monitoring object of the process are/is discontinued and the respective entry is deleted from the supervision file.

16. System for automatically configuring supervision and performing supervision in a supervision system comprising
    a supervision center;
    a supervision block which contains processes performing supervision tasks,
    which method comprises the steps of:
    monitoring and/or controlling via the supervision center the supervision block processes performing supervision tasks,
    wherein the system comprises:
    means for automatically registering in the supervision center the objects monitored by the supervision block processes performing tasks of supervision of the operation of the supervision system;
    means for saving information relating to the processes performing supervision tasks and/or to the services produced by them in the supervision center in conjunction with registration; and
    means for determining the address of the supervision center via a name service.

17. System as defined in claim 16, wherein the supervision system is a telephone switching system.

18. System as defined in claim 16, wherein the system comprises means for receiving operational commands via the communication interface of the supervision block process performing supervision tasks.

19. System as defined in claim 16, wherein the system comprises means for checking the state of a registered supervision block process performing a supervision task before an action request is sent to it.

20. System as defined in claim 16, wherein the system comprises means for controlling the supervision center and/or the supervision block processes performing supervision tasks via the user interface of the supervision center.

21. System as defined in claim 16, wherein the system comprises means for receiving the registrations of supervision block processes performing supervision tasks via an interface.

22. System as defined in claim 16, wherein the system comprises means for sending the result of the supervision block process performing a supervision task to the supervision center.

23. System as defined in claim 16, wherein the system comprises means for storing the registrations of the supervision block processes in a supervision file in the supervision center.

24. System as defined in claim 16, wherein the system comprises:

means for verifying the operation of the supervision block process performing a supervision task; and means for issuing an alarm.

25. System as defined in claim 16, wherein the system comprises means for analyzing the results associated with the processes performing supervision tasks.

26. System as defined in claim 16, wherein the system comprises one or more supervision centers in operation.

27. System as defined in claim 16, wherein the system comprises means for discontinuing a supervision block process performing a supervision task and/or the maintenance of an object monitored by the process and for deleting the respective entry from the supervision file.

28. Method as defined in claim 1, wherein the performing supervision tasks comprises performing testing of a system that the supervision system supervises.

29. System as defined in claim 16, wherein at least one of the processes in the supervision block is configured to test a system that the supervision supervises.

* * * * *